US009633390B2

(12) United States Patent
Acker, Jr. et al.

(10) Patent No.: US 9,633,390 B2
(45) Date of Patent: Apr. 25, 2017

(54) COMPLETING A PURCHASE TRANSACTION AT VARIOUS LOCATIONS WITHIN A RETAIL STORE

(71) Applicant: Wal-Mart Stores, Inc., Bentonville, AR (US)

(72) Inventors: Joel Bennett Acker, Jr., Brush Prairie, WA (US); Richard Neil Cancro, Portland, OR (US); Douglas James Pedley, Portland, OR (US)

(73) Assignee: WAL-MART STORES, INC., Bentonville, AR (US)

( * ) Notice: Subject to any disclaimer, the term of this patent is extended or adjusted under 35 U.S.C. 154(b) by 1097 days.

(21) Appl. No.: 13/754,778

(22) Filed: Jan. 30, 2013

(65) Prior Publication Data
US 2014/0214599 A1    Jul. 31, 2014

(51) Int. Cl.
*G06Q 30/00* (2012.01)
*G06Q 30/06* (2012.01)
*G07G 1/00* (2006.01)
*G06Q 20/20* (2012.01)
*G06Q 20/32* (2012.01)

(52) U.S. Cl.
CPC ......... *G06Q 30/0639* (2013.01); *G06Q 20/20* (2013.01); *G06Q 20/3276* (2013.01); *G06Q 30/0633* (2013.01); *G07G 1/0081* (2013.01)

(58) Field of Classification Search
CPC .......... G06Q 30/0639; G06Q 30/0633; G06Q 20/20; G06Q 20/3276; G07G 1/0081
USPC .............................. 705/26.1–27.2, 14.1, 319
See application file for complete search history.

(56) References Cited

U.S. PATENT DOCUMENTS

| | | | |
|---|---|---|---|
| 6,641,037 B2 | 11/2003 | Williams | |
| 6,837,436 B2 | 1/2005 | Swartz | |
| 7,337,960 B2 * | 3/2008 | Ostrowski | A47F 9/047 235/383 |
| 7,580,699 B1 | 8/2009 | Shaw | |
| 7,734,513 B2 | 6/2010 | Bonner | |
| 2005/0256782 A1 | 11/2005 | Sands | |
| 2011/0178863 A1 * | 7/2011 | Daigle | G06Q 30/0231 705/14.31 |

OTHER PUBLICATIONS

Dilger, Daniel Eran, "Retailers building their own iPod touch, iPad POS systems." Dec. 2, 2010. AppleInsider. http://appleinsider.com/articles/10/12/02/retailers_building_their_own_ipod_touch_ipad_pos_systems.*

* cited by examiner

*Primary Examiner* — Jason Dunham
*Assistant Examiner* — Anand Loharikar
(74) *Attorney, Agent, or Firm* — Howard & Howard Attorneys PLLC

(57) ABSTRACT

Embodiments for determining a completing a purchase transaction at a waypoint where a customer is located within a retail store are disclosed. The embodiments include determining waypoint of the customer, receiving waypoint data including the location of the customer positions within the retail store and a shopping list identifying items that the customer desires to purchase, and completing the purchase transaction for the items at the waypoint.

9 Claims, 7 Drawing Sheets

COMPLETING A PURCHASE TRANSACTION AT VARIOUS LOCATIONS WITHIN A RETAIL STORE

BACKGROUND INFORMATION

Field of the Disclosure

The present disclosure relates generally to for completing a purchase transaction. In particular, example embodiments describe techniques for associates of a retail store to receive a notification including the location of a customer within a retail store to perform a purchase transaction.

Background

A customer may visit retail stores, supermarkets, and superstores, to shop for items such as clothes, groceries, office supplies, household wares, and/or to purchase services. Typically, a customer may traverse the aisles of the retail store and place items to purchase within a shopping cart. Upon gathering all the items that the customer desires to purchase within a shopping cart, the customer proceeds to a checkout counter to complete the transaction and purchase the items.

With this traditional process, customers may be burdened with waiting in long lines at the checkout counters. In addition, long lines at checkout counters may extend into shopping aisles where other customers are shopping.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
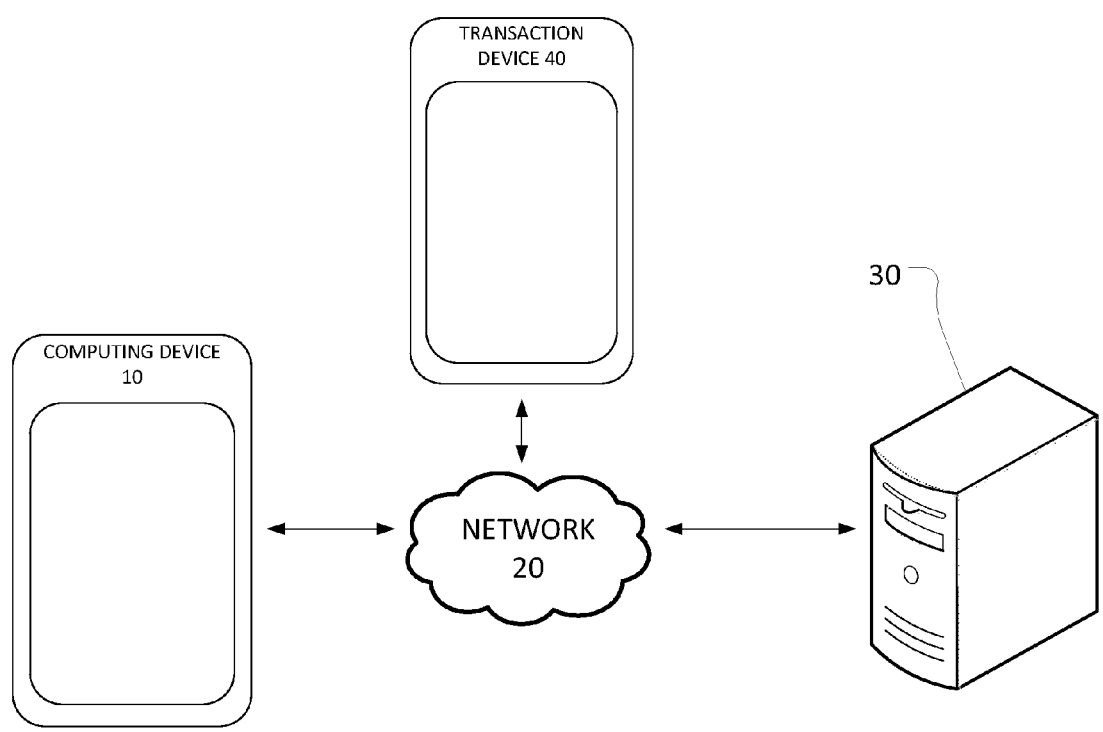
FIG. 1 depicts an example embodiment of a mobile computing device in communication with a point of sale server via a network.

Corresponding reference characters indicate corresponding components throughout the several views of the drawings. It should be appreciated that elements in the figures are illustrated for simplicity and clarity and have not necessarily been drawn to scale. For example, the dimensions of some of the elements in the figures may be exaggerated relative to other elements to help improve understanding of various embodiments of the present disclosure. Further, common but well-understood elements that are useful or necessary in a commercially feasible embodiment are often not depicted in order to facilitate a less obstructed view of the various embodiments of the present disclosure.

DETAILED DESCRIPTION

In the following description, numerous and specific details are set forth in order to provide a thorough understanding of the present invention. It will be apparent, however, that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it should be appreciated that the figures provided herewith are for explanation purposes that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Embodiments disclosed herein are directed towards customers shopping more efficiently within a retail store. As used herein, the term "retail store" may refer to any business or a combination of businesses that sells and/or offers to sell products, and/or services to a customer. While within the retail store the customer may desire to purchase an item. As used herein, the term "item" may refer to groceries, foods, office supplies, clothing wares, or any other fungible goods sold by the retail store. If the customer desires to purchase an item, the customer may scan or obtain an image for a bar code or any type of identifier associated with the desired item via a computing device and place the item within an electronic shopping cart (referred to hereinafter as "shopping cart"). This process may be repeated until the customer has scanned identifiers associated with each item that the customer desires to purchase. The customer may transmit a notification from the computing device including the customer's location and/or the items the customer desires to purchase to an associate of the retail store.

In response to receiving the notification, an associate that is most proximate to the customer may be determined and receive the notification. The associate may determine the location of the customer, proceed to the customer's waypoint, and complete a purchase transaction associated with the items that the customer desires to purchase via a mobile transaction device. Therefore, any location within the retail store may be used as a point of sale, which may reduce a purchase transaction time for the desired items. Accordingly, the customer will not be required to unload items within a shopping cart, have the items scanned by an associate at a dedicated location, and replace the items within the shopping cart.

Referring now to FIG. 1, a computing device 10 in communication with a point of sale (POS) server 30 and transaction device 40 via a network 20 is depicted.

Network 20 may be a wired or wireless network such as the Internet, an intranet, a LAN, a WAN, a cellular network or another type of network. It will be understood that network 20 may be a combination of multiple different kinds of wired or wireless networks.

POS server 30 may be a computing device such as a general hardware platform server that is capable of supporting mobile applications, software and the like executing on computing device 10. POS server 30 may include physical computing devices residing at a particular location or may be deployed in a cloud computing network environment. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). POS server 30 may include any combination of one or more computer-usable or computer-readable media. For example, POS server 30 may include a computer-readable medium including one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. POS server 30 may include any combination of one or more computer-usable or computer-readable media.

Computing device 10 may be a smart phone, tablet computer, laptop computer, personal data assistant or any other type of mobile device with a hardware processor that is configured to process instructions and connect to network 20, one or more portions of network 20, POS server 30, transaction device 40 and/or any type of device that may assist in completing a purchase transaction. Computing device 10 may be configured to scan or obtain images of identifiers, such as bar codes, associated with items that the customer desires to purchase within the retail store to generate a shopping list. Computing device 10 may also be configured to determine a waypoint of computing device 10 within the retail store. Computing device 10 may transmit a notification including the shopping list and waypoint to POS server 30 and/or transaction device 40.

Transaction device 40 may be a smart phone, tablet computer, laptop computer, personal data assistant or any other type of mobile device with a processor configured to process instructions and connect to network 20, one or more portions of network 20, POS server 30, computing device 10, and/or any type of device that may assist in completing a purchase transaction. Transaction device 40 may also include an interface to receive the notification from computing device 10 including the list and waypoint of computing device 10, and a processor to present the shopping list and the waypoint to an associate of the retail store. Transaction device 40 may include a device configured to read magnetic stripe cards, such as credit cards. The associate of the retail store utilizing transaction device 40 may determine the waypoint of the customer, proceed to the waypoint, and complete a purchase transaction associated with items within the shopping list generated by computing device 10.

Figure 2A:
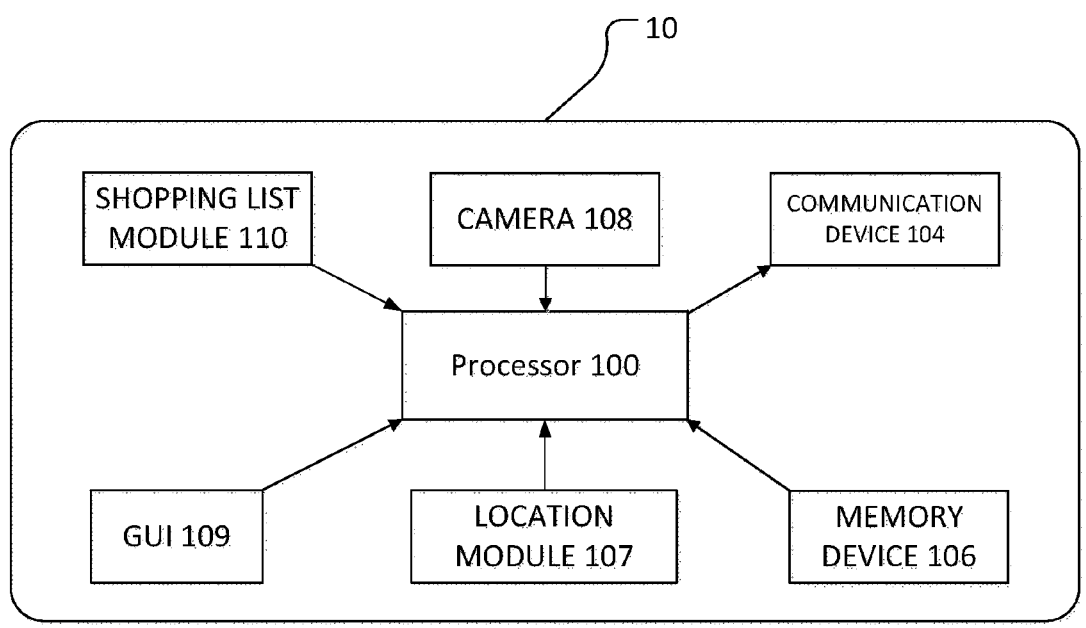
FIG. 2A depicts an example embodiment of example components of a mobile computing device.

FIG. 2A is an embodiment of a block diagram depicting example components of computing device 10. As shown in the illustrative example, computing device 10 includes a processing device 100, a communication device 104, a memory device 106, location module 107, camera 108, graphical user interface (GUI) 109, and shopping list module 110.

Processing device 100 can include memory, e.g., read only memory (ROM) and random access memory (RAM), storing processor-executable instructions and one or more processors that execute the processor-executable instructions. In embodiments where processing device 100 includes two or more processors, the processors can operate in a parallel or distributed manner. Processing device 100 can execute an operating system of computing device 10 or software associated with other elements of computing device 10.

Communication device 104 is a device that allows the computing device 10 to communicate with another device, e.g., the POS server 20, via the network 30. Communication device 104 can include one or more wireless transceivers for performing wireless communication and/or one or more communication ports for performing wired communication. Memory device 106 is a device that stores data generated or received by the computing device 10. Memory device 106 can include, but is not limited to a hard disc drive, an optical disc drive, and/or a flash memory drive.

Location module 107 may be configured to determine a waypoint of computing device 10. As used herein the term "waypoint" refers generally to a location in a retail store, e.g., a location of a product or an entrance. A waypoint can be represented in geographic coordinates, Cartesian coordinates, e.g., an (x, y) point if the store is divided into a Cartesian plane, and/or can be represented using reference points, e.g., "aisle 4, 50 feet from the front of the retail store." Location module 107 may be configured to transmit and/or receive wireless waypoint data such as real-time locating system signals (RTLS), WiFi signals, GPS, Bluetooth, short range radio signals, etc. to determine the waypoint of mobile computing device 10.

Camera 108 may be any device that records images that can be stored within memory device 106 or transmitted to another location such as POS server 30 via communication device 104 over network 20. Camera device 108 can be but is not limited to being a device that can record still images or videos. In one embodiment, camera device 108 may be configured to record images of identifiers such as a bar code, Q-code, an item, or any other identifier associated with an item.

GUI 109 is a device that allows a user to interact with the computing device 10. While one GUI is shown, the term "user interface" can include but is not limited to being a touch screen, a physical keyboard, a mouse, a microphone, and/or a speaker. GUI 109 may include a display configured to present images to the customer on mobile computing device 10 such as a map of the retail store or items within a shopping list. GUI 109 may include inputs where the customer may insert or remove items from the shopping list.

Shopping list module 110 is embodied as processor-executable instructions stored in the memory of the processing device 100, where processing device 100 can execute shopping list module 110. Shopping list module 110 may be configured to utilize camera device 108 to receive identifiers associated with items that the customer desires to purchase. In embodiments, the identifier associated with the items may be bar codes, Q-codes or any other known type of identifier correlating the item with an entry in a database associated with the item. The identifiers may collectively define a shopping list of items that the user desires to complete a purchase transaction for.

Once the customer completes shopping within the retail store, the customer may press an input on GUI 109 to transmit a notification to an associate of the retail store to complete a purchase transaction for the items within a shopping list. Communication device 104 may transmit the notification including waypoint data associated with the location mobile computing device 10 to POS server 30 and the identifiers for each item within the shopping list. In response to communication device 104 transmitting the notification to POS server 30, an associate of the retail store may be presented with data indicating the waypoint of the customer, proceed to the waypoint of the customer, and complete a purchase transaction for the items within the shopping list.

Figure 2B:
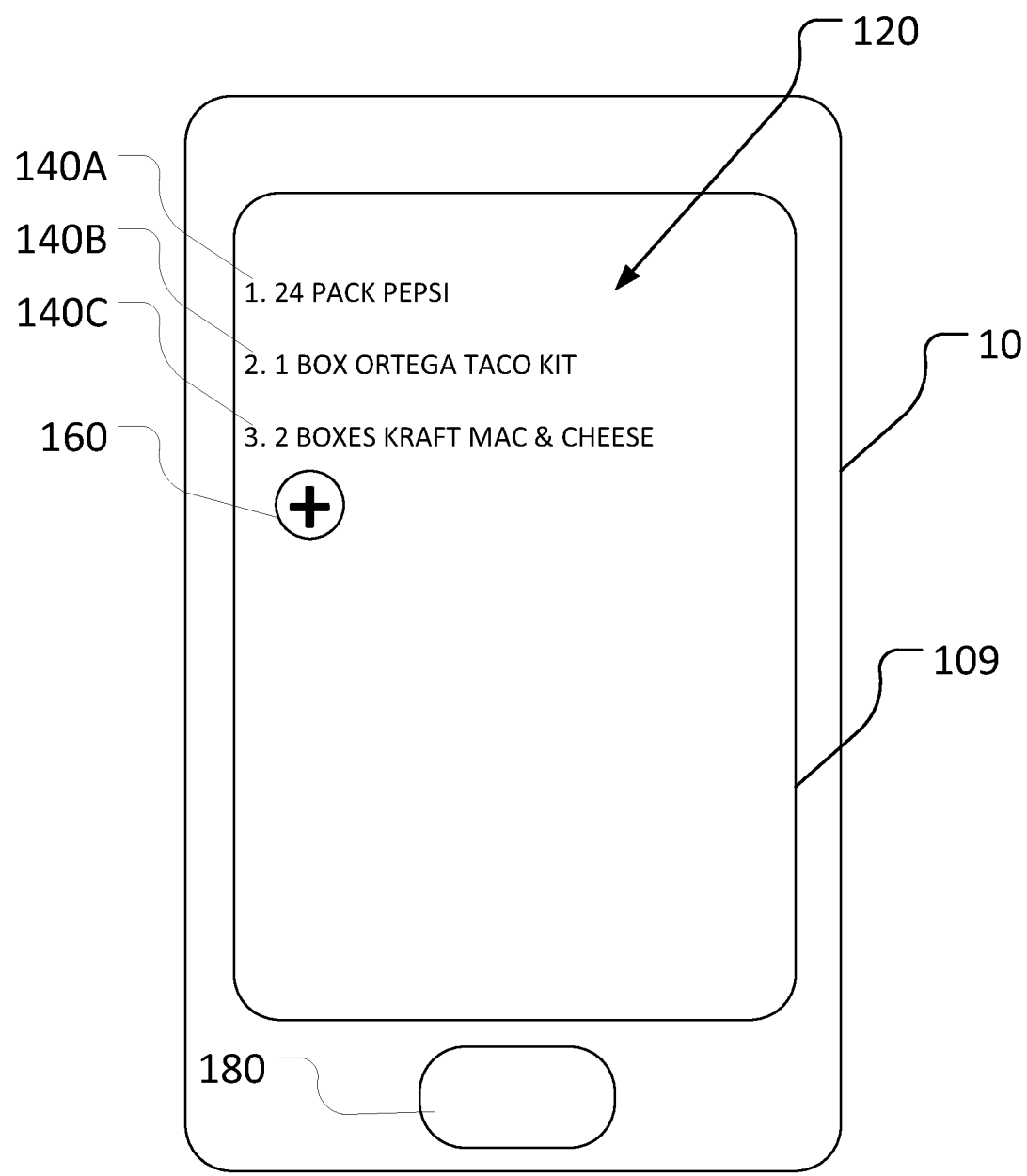
FIG. 2B depicts an example embodiment of a graphical user interface of a mobile computing device.

FIG. 2B illustrates a display of a shopping list 120 including the items that the customer desires to purchase on GUI 109. Shopping list 120 includes items selected by the customer via computing device 10, e.g., item 140A, item 140B, and item 140C. Further, a field 160 allows the customer to scan additional identifiers of items to add additional items to shopping list 120. When the customer presses field 160, the customer is provided with an opportunity to add an item to the shopping list via camera 108 obtaining an image of an identifier for an item, by the customer manually entering text associated with an identifier of the item, or by any other mechanism identifying the item. In the example, the user has added a first item 140A indicating a 24 pack of PEPSI®, a second item 140B indicating an ORTEGA® taco kit, and a third item 140C indicating a box of KRAFT MAC & CHEESE® to the shopping list.

If the customer has finished generating the shopping list, the customer can press, or otherwise select, button 180. If the customer presses button 180, computing device 10 may determine a waypoint of the customer within the retail store. In response to the customer pressing button 180, computing device 10 may transmit a notification including the waypoint of the customer and shopping list 120 to POS server 30.

Figure 3:
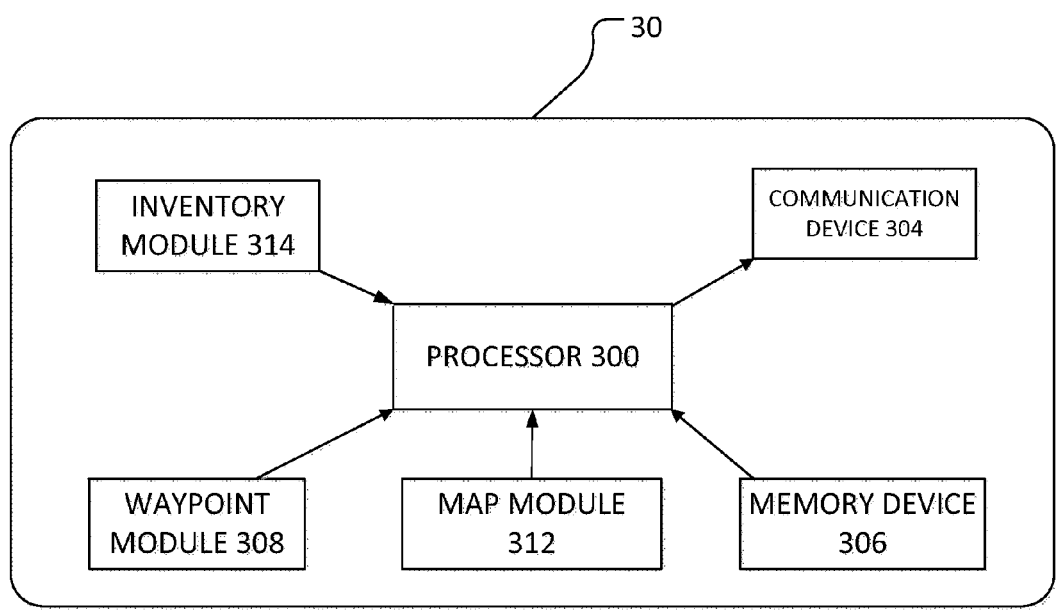
FIG. 3 depicts an example embodiment of example components of a point of sale server.

FIG. 3 illustrates components of POS server 30 configured to perform one or more of the requested functions from mobile computing device 10 or transaction device 40. In the illustrated embodiment, POS server 30 may include a processing device 300, a communication device 304, memory device 306, waypoint module 308, map module 312, and inventory module 314.

Processing device 300 can include memory, e.g., read only memory (ROM) and random access memory (RAM), storing processor-executable instructions and one or more processors that execute the processor-executable instructions. In embodiments where processing device 300 includes two or more processors, the processors can operate in a parallel or distributed manner. In the illustrative embodiment, processing device 300 executes waypoint module 308, map module 312 and inventory module 314.

Communication device 304 is a device that allows POS server 30 to communicate with others device, e.g., the computing device 10 and/or transaction device 40, via network 20. Communication device 304 may include one or more wireless transceivers for performing wireless communication and/or one or more communication ports for performing wired communication.

Memory device 306 is a device that stores data generated or received by POS server 30. Memory device 306 can include, but is not limited to a hard disc drive, an optical disc drive, and/or a flash memory drive. Further, memory device 306 may be distributed and located at multiple locations. Memory device 306 is accessible to the processing device 300. In embodiments, memory device 306 may be configured to store information associated with waypoint module 308, map module 312, and inventory module 314. In one embodiment, memory device 306 may store waypoint data for waypoint module 308 received from computing device 10 indicating the waypoint of a customer within the retail store, a map of a retail store for map module 312, and identifiers and pricing information associated with items carried by the retail store for inventory module 314.

Waypoint module 308 may be configured to transmit and/or receive waypoint data identifying a location of computing device 10 within a retail store in response to receiving the notification from computing device 10. Waypoint data transmitted via waypoint module 308 may include an identifier, such as a star, disposed at the coordinates of mobile computing device 10 within the retail store and data associated with a map of the retail store. In embodiments, the transmitted data may include the identifier superimposed on the map of the retail store so an associate of the retail store may readily determine the waypoint of the customer within the retail store. Waypoint module 308 may also determine a waypoint of transaction device 40 within a retail store via any known means, such as a RTLS WiFi, radar, mobile device tracking, time distance of arrival (TDOA) signals, short wave radio, Bluetooth, etc. Waypoint module 308 can perform known triangulation techniques to determine the current waypoint of the transaction device 40 and other transaction devices within the retail store, and store data associated with the current waypoint of transaction devices in memory device 306. In one example embodiment, to determine waypoints of transaction device 40, waypoint module 308 may transmit and receive waypoint signals to transceivers positioned throughout a retail store and/or transaction device 40. In response to transmitting waypoint signals to the transceivers, waypoint module 308 may receive waypoint data to determine the waypoint of transaction device 40. Waypoint module 308 may compare the receive waypoint data within the notification from computing device 10 with known waypoints of transaction devices 40 carried by associates of the retail store to determine the closest associate to the customer.

Map module 312 may be configured to obtain maps corresponding to the layout of retail stores. Map module 312 may receive a map of the retail store from a plurality of sources such as the retail store itself, a partner of a retail store, the internet, or any other source of map information. In some embodiments, map module 312 includes maps that comprise a specific layout of a retail store including product placement indicators, size of different departments, and/or isles of the retail store.

Inventory module 314 may be configured to determine items a customer desires to purchase within the received shopping list in response to receiving the notification from computing device 10. Inventory module 314 may be configured to map the received identifier associated with an item within the notification with identifiers for inventory items stored within a database in memory device 306. Inventory module 314 may also determine a price within the database entry for each item within the shopping list. Once each identifier corresponding to items within the shopping list and their corresponding prices are determined, inventory module 314 may generate a receipt for the shopping list. Inventory module 314 may transmit the receipt for the shopping list to transaction device 40 that is proximate to the computing device 10. In embodiments, the receipt may be transmitted with data indicating the waypoint of the customer to transaction device 40.

In response to transmitting the receipt and waypoint of computing device 10 to transaction device 40, an associate of the retail store may be presented with data indicating the receipt and waypoint for the customer on transaction device 40. The associate may accept or deny assisting with a purchase transaction associated with the receipt by interacting with an interface of transaction device 40. If the associate accepts assisting the customer, the associate may proceed to the waypoint of the customer. If the associate denies assisting the customer, the associate may perform an action on transaction device 40 to transmit a notification to POS server 30 that the associate may not assist the customer with the purchase transaction. In response to receiving the notification from transaction device 40, waypoint module 308 may determine the next proximate transaction device and transmit the data indicating the waypoint of computing device 10 to the next proximate transaction device. If all the associates are busy or deny assisting the customer, POS server 30 may transmit a signal to computing device 10. The signal may indicate that associates with mobile transaction devices 40 are unable to assist the customer, and the customer should proceed to a checkout counter of the retail store to complete a purchase transaction.

Figure 4A:
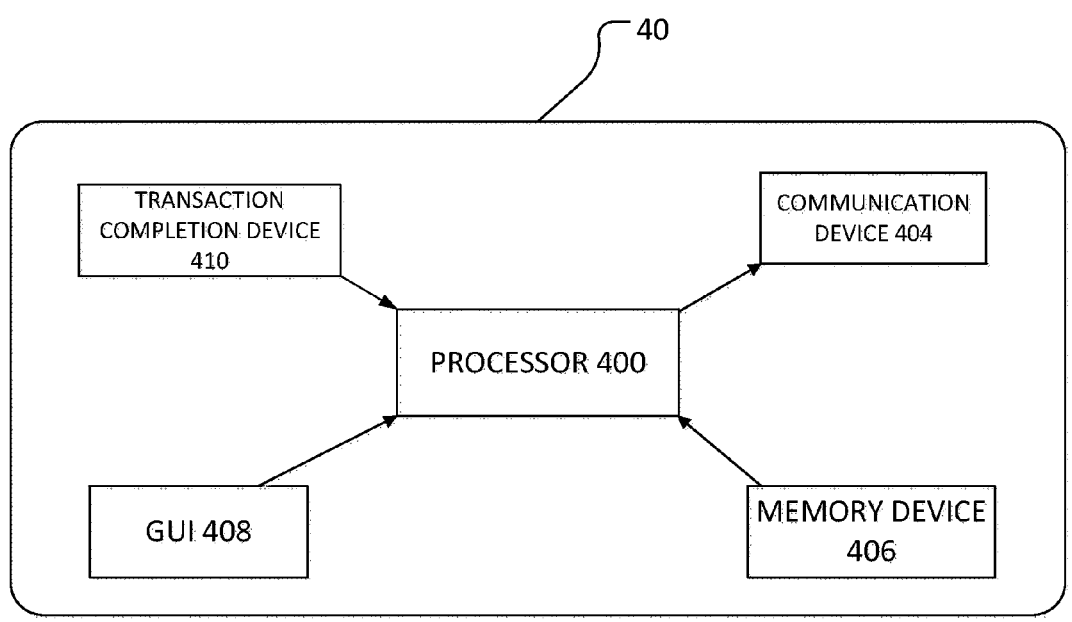
FIG. 4A depicts an example embodiment of example components of a tracking device.

FIG. 4A is an embodiment of a block diagram depicting example components of transaction device 40. As shown in the illustrative example, transaction device 40 includes a processing device 400, a communication device 404, a memory device 406, transaction completion device 410, and graphical user interface (GUI) 408.

Processing device 400 can include memory, e.g., read only memory (ROM) and random access memory (RAM), storing processor-executable instructions and one or more processors that execute the processor-executable instructions. In embodiments where processing device 400 includes two or more processors, the processors can operate in a parallel or distributed manner. Processing device 400 can execute an operating system of transaction device 40 or software associated with other elements of transaction device 40.

Communication device 404 is a device that allows transaction device 40 to communicate with another device, e.g., the POS server 20 and computing device 10, via network 30. Communication device 404 can include one or more wireless transceivers for performing wireless communication and/or one or more communication ports for performing wired communication. Memory device 406 is a device that stores data generated or received by transaction device 40. Memory device 406 can include, but is not limited to including a hard disc drive, an optical disc drive, and/or a flash memory drive.

Transaction completion device 410 may be a data input device that reads information received from POS server 30 or computing device 10 associated with items within a shopping list that a customer desires to purchase. Transaction completion device 410 may also include an interface such as a card reader, numerical pad, or any other interface configured to receive data associated with a method of payment for the items on the shopping list. In embodiments, transaction completion device 410 may include a magnetic card reader to read magnetic stripe cards, such as credit cards. In other embodiments, transaction completion device 410 may include an interface where the customer may enter billing information to be charged for the items within the shopping list over network 30. In response to a user interfacing a method of payment with transaction completion device 410 a monetary transaction may be performed for the items within the shopping list.

GUI 408 is a device that allows an associate of the retail store to interact with transaction device 40. GUI 408 may include a display to present images to an associate of the retail store, such as a map of the retail store or items within the shopping list. GUI 408 may include inputs which an associate may press to complete a purchase transaction for items within the shopping list. In one embodiment, in response to the customer transmitting a notification including a shopping list and waypoint data of the customer to POS server 30, POS server 30 may relay this data to transaction device 40. In one embodiment, POS server 30 may also transmit a map of the retail store with an identifier of the waypoint of the customer superimposed on the map displayed on GUI 408. The associate may proceed to the waypoint of the customer to perform a purchase transaction for the items within the shopping list generated by computing device 10.

Figure 4B:
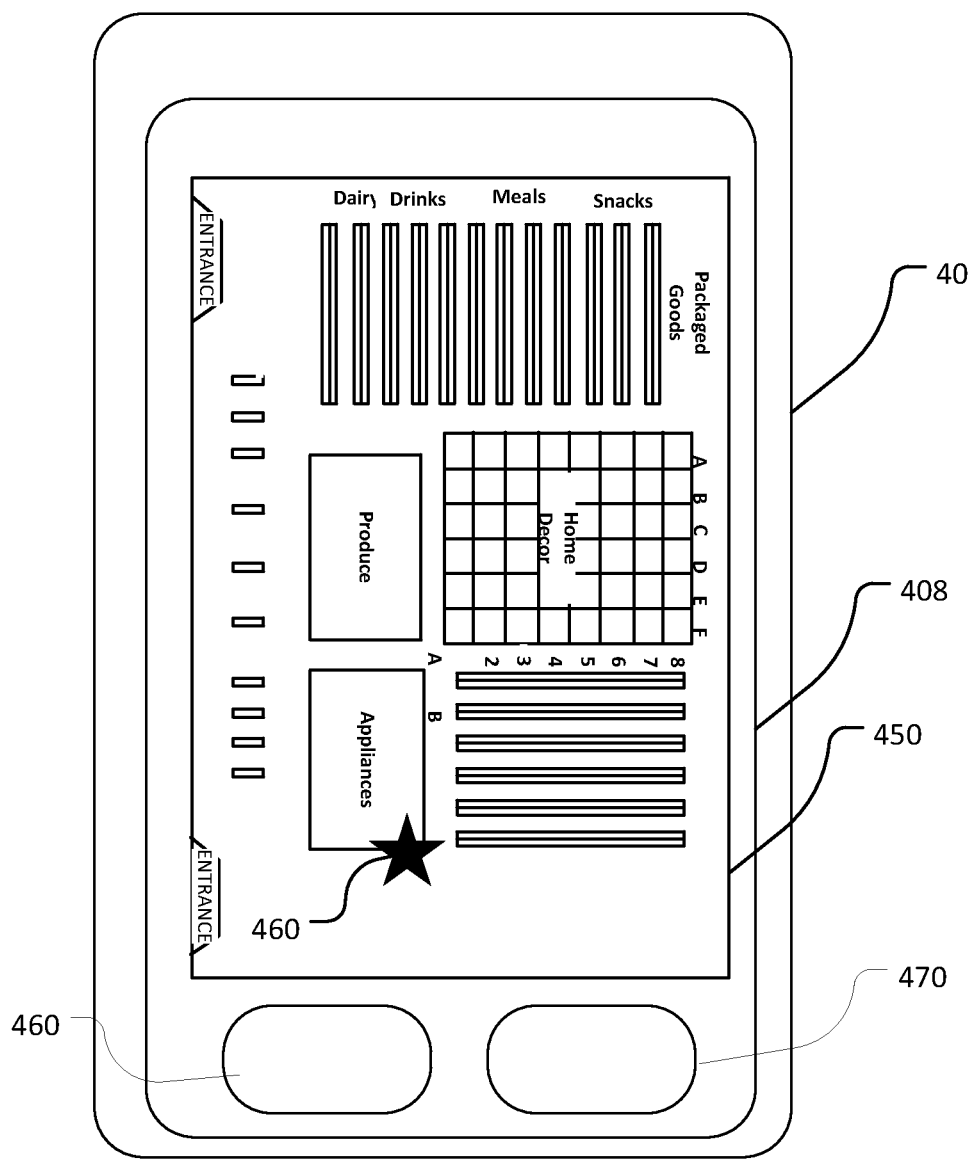
FIG. 4B depicts an example embodiment of a graphical user interface of a tracking device.

Referring to FIG. 4B, an example of a map 450 corresponding to the layout of the retail store displayed on GUI 408 is depicted. It is noted that the example map 450 is provided for example and is not limiting. In the illustrated example, waypoint 460 is associated with the location of the customer when the customer transmits the notification from computing device 10 to POS server 30. As depicted, waypoint 460 is presented as a star superimposed on map 450. However, waypoint 460 may be presented in other shapes, sizes, and identifiers such as pulsating dots.

If the associate of the retail store is able to assist in completing the transaction associated with the customer at waypoint 460, the associate may press button 460. In response to pressing button 460, transaction device 40 may transmit an acceptance to POS server 30 indicating the associate will assist in the transaction. The associate of the retail store may readily determine waypoint 460 on map 450, proceed to the corresponding waypoint of the customer, and complete a purchase transaction for the items within the shopping list via transaction device 40 at waypoint 460. If the associate of the retail store is not able to assist in completing the purchase transaction associated with the customer at waypoint 460, the associate may press button 470. In response to pressing button 470, transaction device 40 may transmit a denial to POS server 30 indicating the associate will not assist in the purchase transaction. POS server 30 may then determine the next proximate transaction device to waypoint 460 and transmit the notification to that transaction device.

In response to transmitting the receipt and waypoint of computing device 10 to transaction device 40, an associate may accept or deny assisting with a purchase transaction associated with the receipt by interacting with an interface of transaction device 40. If the associate accepts assisting the customer, the associate may proceed to the waypoint of the customer. If the associate denies assisting the customer, waypoint module 408 may determine the next proximate transaction device and transmit the waypoint of computing device 10 to the next proximate transaction device.

Figure 5:
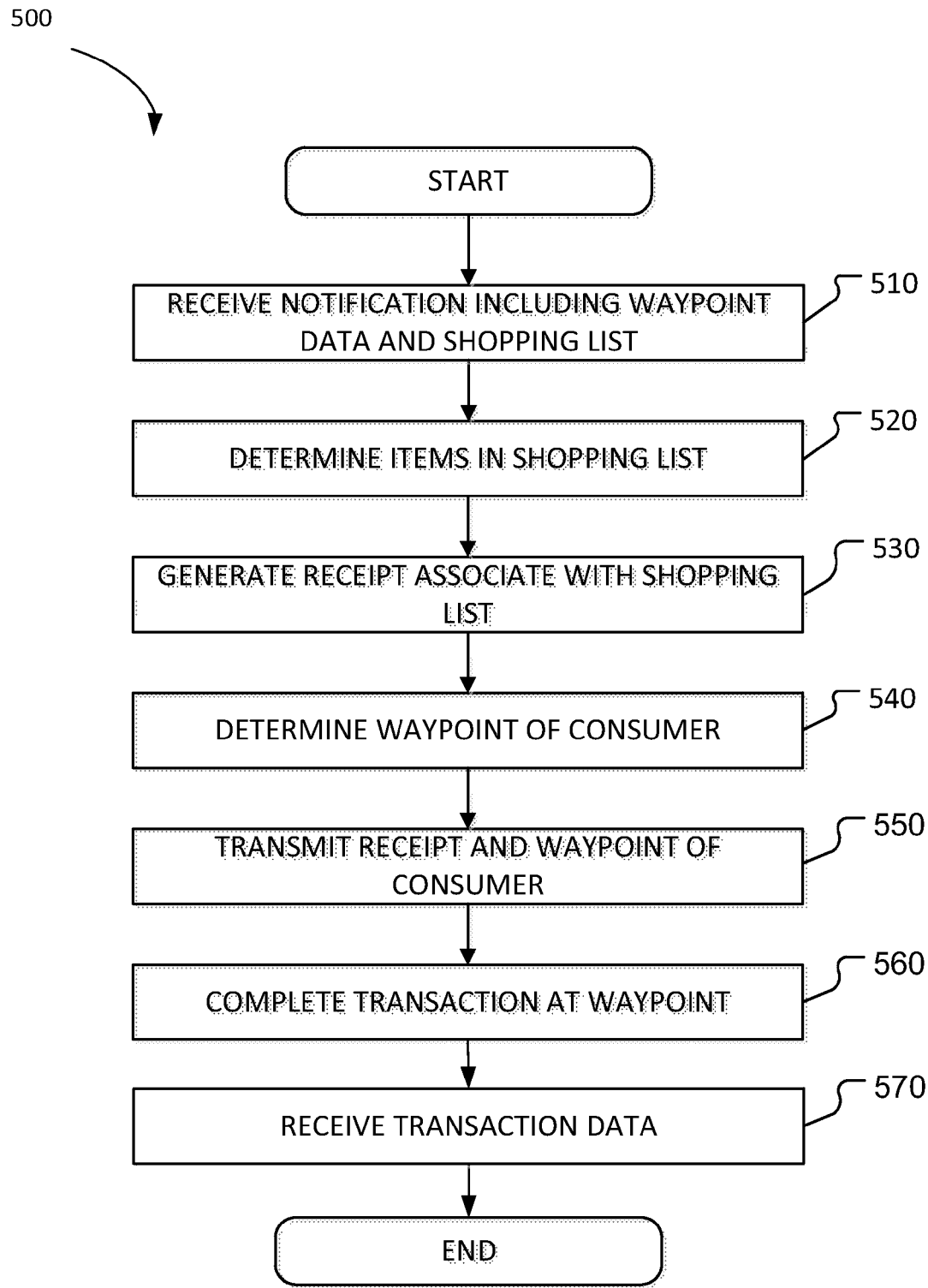
FIG. 5 depicts an example method for completing a purchase transaction at a waypoint of a customer within a retail store.

Referring now to FIG. 5, an example method 500 for completing a purchase transaction within a retail store is illustrated. In the illustrated example, the method 500 is executed by the processing device of POS server 30. It is noted that method 500 may be modified such that the method 500 can be executed by processing device 100 of computing device 10, transaction device 40, and/or a combination of both. It is further noted, that method 500 is presented as a non-limiting example, and other embodiments steps recited in method 500 may be omitted, rearranged or additional steps may be included.

At operation 510, a POS server may receive a notification including waypoint data of a customer within a retail store and item data associated with identifiers for items within a shopping list that the customer desires to purchase. In one embodiment, the customer may generate a shopping list by scanning or obtaining images, via a camera on a computing device, of barcodes or other identifiers associated with the items that the desire to purchase.

At operation 520, the POS server may compare the received identifiers associated with the items on the received shopping list with identifiers or barcodes for inventory items stored within a database to determine which item the customer desires to purchase. If the received identifier matches an identifier for an inventory item, then POS server may determine that the customer desires to purchase that item.

At operation 530, the POS server may generate a receipt associated with the items on the shopping list. POS server may generate the receipt by combining the price of each item within on shopping list, wherein the price for each item may be stored in a corresponding entry associated with the item in a database. In embodiments, the receipt may include a name and price associated with each item that the customer desires to purchase.

At operation 540, the POS server may determine a waypoint of the customer in response to the received waypoint data. The waypoint of the customer may be performed by known triangulation techniques or any other method.

At operation 550, the POS server may transmit the receipt and the waypoint of the customer, which may be superimposed on a map of the retail store. In one embodiment, the receipt and waypoint of the customer may be transmitted to a POS device. An associate of the retail store may readily determine waypoint of the customer and proceed to the customer's waypoint.

At operation 560, a purchase transaction associated with the items within the shopping list may be completed at the waypoint of the customer, and data associated with the purchase transaction may be transmitted to the POS server. An associate of the retail store may interface a method of payment for the customer with a transaction interface such as a card reader, numerical pad, or any other interface configured to receive payment for the items on the shopping list at the location of the customer.

At operation 570, the POS server may receive the purchase transaction data, which may include a method of payment and the items purchased by the customer at the customer's waypoint.

In view of the above, any location within the retail store may be used as a point of sale for items and a customer will not be required to load the items into a shopping cart, unload the items to be scanned, and reload the items at a dedicated checkout portion of the retail store. Further, an associate of the retail store that is closest to the customer's location may be notified of the customer's desire to complete a purchase transaction, which may reduce the time needed for an associate to proceed to the customer's location. Therefore, customers and retail stores may create a more efficient shopping experience.

The above description of illustrated examples of the present disclosure, including what is described in the Abstract, are not intended to be exhaustive or to be limitation to the precise forms disclosed. While specific embodiments of, and examples for, the disclosure are described herein for illustrative purposes, various equivalent modifications are possible without departing from the broader spirit and scope of the present disclosure. Indeed, it is appreciated that the specific examples are provided for explanation purposes and that other values may also be employed in other embodiments and examples in accordance with the teachings of the present disclosure.

What is claimed is:

1. A mobile transaction device of a store associate, the mobile transaction device comprising:
   a communication device configured to communicate with a sales server and a computing device associated with a customer, the communication device configured to receive:
      a plurality of waypoint signals from a plurality of transceivers positioned in a retail store, the plurality of waypoint signals indicating a location of the mobile transaction device, and a plurality of coordinates associated with the customer computing device indicating a location of the customer computing device, wherein a comparison of the location of the mobile transaction device and the location of the customer computing device by the sales server determines that the mobile transaction device is closest in proximity to the customer computing device of a plurality of mobile transaction devices within the retail store,
      a map of a retail store, and
      from the customer communication device, a receipt indicating a shopping list comprising one or more items a consumer desires to purchase;
   a graphical user interface configured to:
      render a superimposed image on the map in accordance with the plurality of coordinates, the superimposed image indicating the location of the customer computing device within the retail store,
      display the map and the receipt,
      display a prompt requiring the store associate to accept or deny a request to complete a transaction associated with the shopping list, and
      receive a response to the prompt indicating that the store associate accepted the request and will proceed to the location of the customer computing device;

a transaction completion device configured to perform the transaction at the location of the customer computing device; and the communication device further configured to transmit transaction data associated with the transaction to the sales server.

2. The mobile transaction device of claim 1, wherein the shopping list is generated by the customer by scanning, with the customer computing device, an identifier one or more identifiers associated with the one or more items.

3. The mobile transaction device of claim 1, wherein the transaction completion device comprises an interface for receiving data associated with a method of payment.

4. The mobile transaction device of claim 1, wherein the transaction completion device comprises a card reader.

5. A computer-implemented method comprising:

receiving, by a communication device of a mobile transaction device of a store associate configured to communicate with a sales server and a computing device associated with a customer:

a plurality of waypoint signals from a plurality of transceivers positioned in a retail store, the plurality of waypoint signals indicating a location of the mobile transaction device, and a plurality of coordinates associated with the customer computing device indicating a location of the customer computing device, wherein a comparison of the location of the mobile transaction device and the location of the customer computing device by the sales server determines that the mobile transaction device is closest in proximity to the customer computing device of a plurality of mobile transaction devices within the retail store;

a map of a retail store, and from the customer communication device, a receipt indicating a shopping list comprising one or more items a consumer desires to purchase;

rendering, by a graphical user interface of the mobile transaction device, a superimposed image on the map in accordance with the plurality of coordinates, the superimposed image indicating a location of the customer computing device within the retail store, displaying, on the graphical user interface, the map and the receipt;

displaying, on the graphical user interface, a prompt requiring the store associate to accept or deny a request to complete a transaction associated with the shopping list;

receiving, by the graphical user interface, a response to the prompt indicating that the store associate accepted the request and will proceed to the location of the customer computing device;

performing, by a transaction completion device of the mobile transaction device, the transaction at the location of the customer computing device; and transmitting, by the communication device, transaction data associated with the transaction to the sales server.

6. The computer-implemented method of claim 5, wherein the shopping list is generated by the customer by scanning, with the customer computing device, one or more identifiers associated with the one or more items.

7. The computer-implemented method of claim 5, wherein the transaction completion device comprises an interface for receiving data associated with a method of payment.

8. The computer-implemented method of claim 5, wherein the transaction completion device comprises a card reader.

9. A mobile transaction device of a store associate, the mobile transaction device comprising:

a communication device configured to communicate with a sales server and a plurality of computing devices associated with customers, the communication device configured to receive:

a plurality of waypoint signals from a plurality of transceivers positioned in a retail store, the plurality of waypoint signals indicating a location of the mobile transaction device, and a plurality of coordinates associated with the plurality of customer computing devices, wherein a comparison of the location of the mobile transaction device and the plurality of coordinates associated with the plurality of customer computing devices by the sales server determines that the mobile transaction device is closest in proximity to a first customer computing device of a plurality of mobile transaction devices within the retail store, a map of a retail store, and from the first customer communication device, a receipt indicating a shopping list comprising one or more items a consumer desires to purchase;

a graphical user interface configured to:

render a superimposed image on the map in accordance with the plurality of coordinates associated with the first customer computing device, the superimposed image indicating a location of the first customer computing device within the retail store, display the map and the receipt, display a prompt requiring a user of the mobile transaction device to accept or deny a request to complete a transaction associated with the shopping list, receive a response to the prompt indicating that the store associate denied the request;

the communication device further configured to:

transmit a notification to the sales server indicating that the request was denied, receive a location of a second customer computing device determined to be second closest in proximity to the mobile transaction device, and receive, from the second customer communication device, a second receipt indicating a second shopping list comprising one or more items a consumer desires to purchase;

the graphical user interface further configured to:

render a second superimposed image on the map indicating the location of the second customer computing device within the retail store, display the map and the second receipt, display a second prompt requiring the store associate to accept or deny a second request to complete a transaction associated with the second shopping list, receive a response to the second prompt indicating that the store associate accepted the second request and will proceed to the location of the second customer computing device;

a transaction completion device configured to perform the transaction at the location of the second customer computing device; and the communication device further configured to transmit transaction data associated with the transaction to the sales server.

* * * * *